United States Patent [19]

Hadfi

[11] Patent Number: 5,592,341
[45] Date of Patent: Jan. 7, 1997

[54] METHOD OF OPTIMIZING A WRITE CURRENT FOR AT LEAST ONE ROTATABLE MAGNETIC HEAD AND ARRANGEMENT FOR CARRYING OUT SUCH A METHOD

[75] Inventor: Gabor Hadfi, Vienna, Austria

[73] Assignee: U.S. Philips Corporation, New York, N.Y.

[21] Appl. No.: 373,358

[22] Filed: Jan. 17, 1995

[30] Foreign Application Priority Data

Feb. 3, 1994 [AT] Austria .................................. 207/94

[51] Int. Cl.[6] ........................................... G11B 5/09
[52] U.S. Cl. ................................. 360/46; 360/31; 360/53
[58] Field of Search ......................... 360/31, 46, 64, 360/65, 53

[56] References Cited

U.S. PATENT DOCUMENTS

| | | | |
|---|---|---|---|
| 4,764,816 | 8/1988 | Heitmann | 360/31 X |
| 5,196,967 | 3/1993 | Mederer et al. | 360/66 |

FOREIGN PATENT DOCUMENTS

| | | | |
|---|---|---|---|
| 3530142 | 2/1987 | Germany | H04N 5/782 |
| 3739180 | 6/1989 | Germany | H04N 5/78 |
| 4118533 | 12/1992 | Germany | |
| 59-110017 | 6/1984 | Japan | |

OTHER PUBLICATIONS

English abstract of JP 59-110017, Oct. 26, 1984 "Magnetic Recording System".

Primary Examiner—W. Chris Kim
Attorney, Agent, or Firm—Edward W. Goodman

[57] ABSTRACT

Method of optimizing a write current for at least one rotatable magnetic head and arrangement for carrying out such a method.

In a method of optimizing a write current for at least one rotatable magnetic head (K1, K2), in which method a write current (I) is applied to the magnetic head (K1, K2) as a test signal with a given number of graded amplitude values within a given time interval and this test signal is recorded on the magnetic tape (5) by the magnetic head (K1, K2), the total given number of graded amplitude values of the write current (I), which is applied to the magnetic head (K1, K2) as a test signal, is applied to the magnetic head (K1, K2) within a single scanning period (T) of this magnetic head.

20 Claims, 3 Drawing Sheets

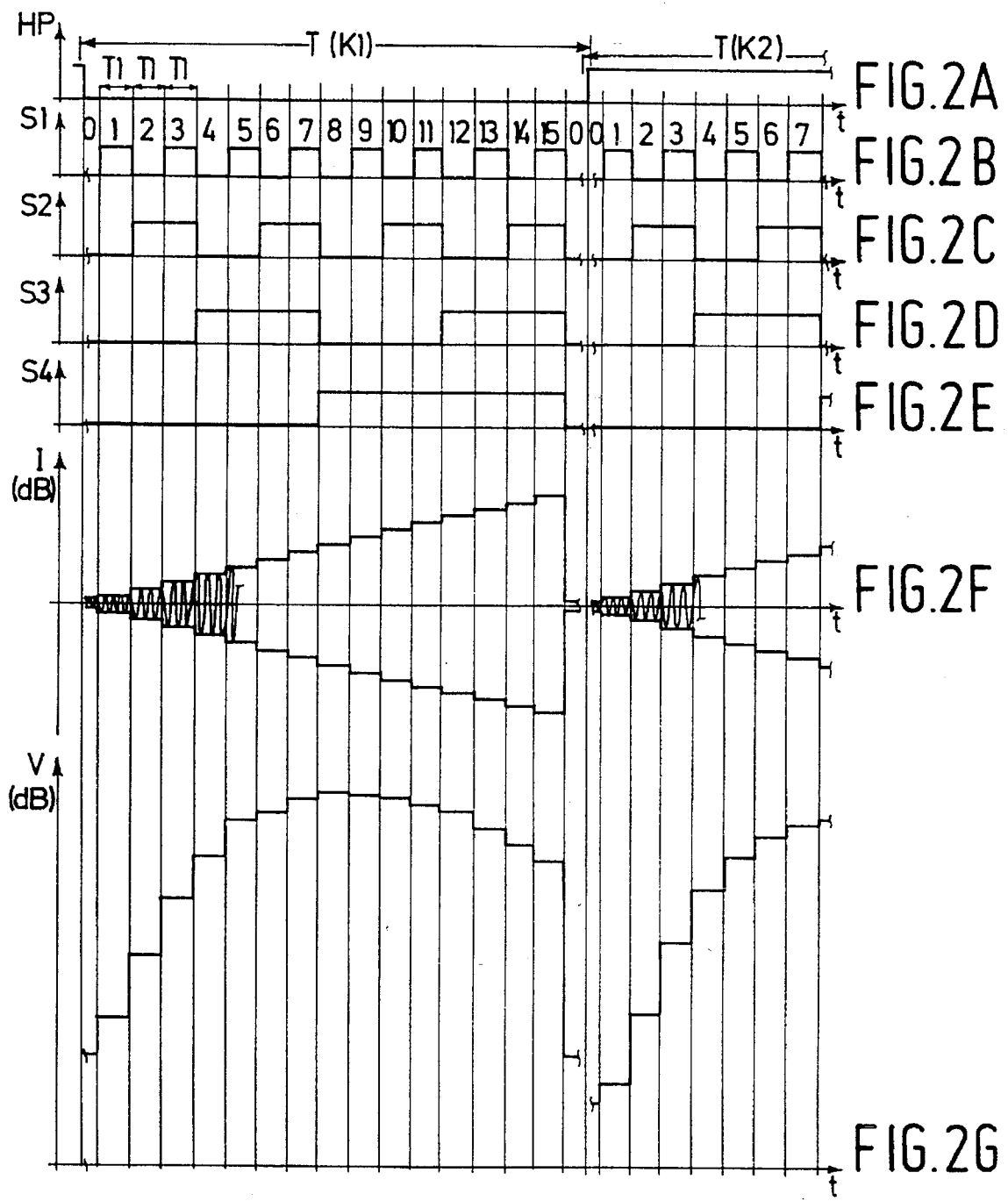

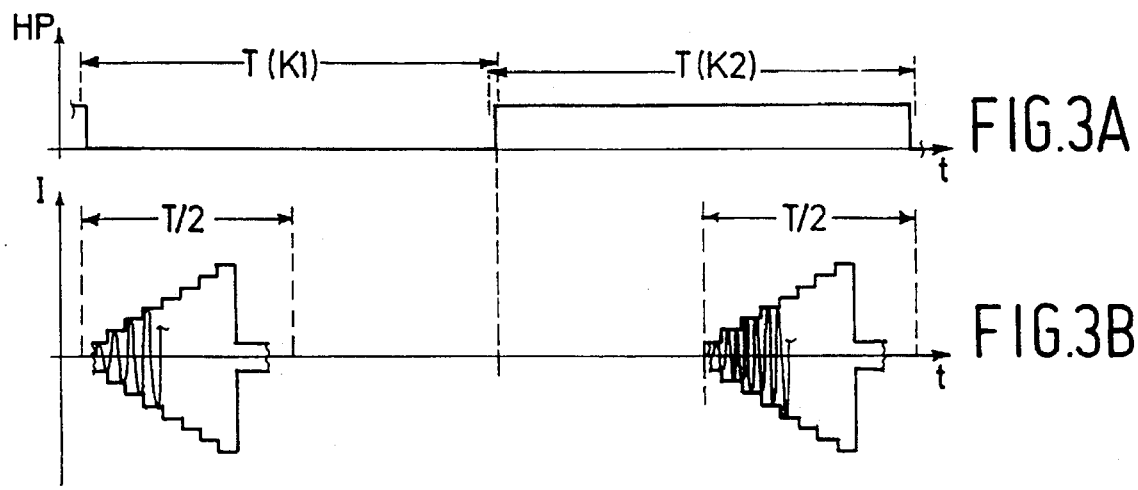
FIG.3A
FIG.3B
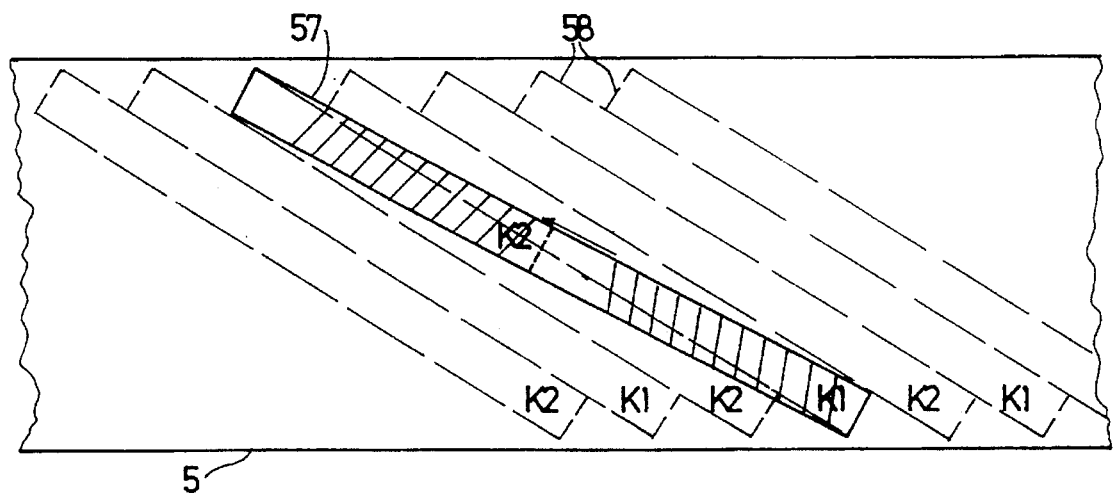
FIG.4

METHOD OF OPTIMIZING A WRITE CURRENT FOR AT LEAST ONE ROTATABLE MAGNETIC HEAD AND ARRANGEMENT FOR CARRYING OUT SUCH A METHOD

BACKGROUND OF THE INVENTION

1. Field of the Invention

The invention relates to a method of optimizing a write current for at least one rotatable magnetic head by means of which a magnetic tape can be scanned along tracks which are inclined relative to the longitudinal direction of the magnetic tape in consecutive scanning periods, a write current being applied to the magnetic head as a test signal with a given number of graded amplitude values within a given time interval and this test signal being recorded on the magnetic tape by the magnetic head, and the recorded test signal being scanned from the magnetic tape and the level values of the scanned and reproduced test signal, which correspond to the graded amplitude values of the write current recorded as the test signal, being determined, and an optimum amplitude value of the write current being determined from the level values thus determined.

The invention also relates to an arrangement for carrying out a method of the type defined in the opening paragraph, for optimizing a write current for at least one rotatable magnetic head of the arrangement, by means of which a magnetic tape, which can be driven in the arrangement in the longitudinal direction of the tape, can be scanned in consecutive scanning periods along tracks which are inclined relative to the longitudinal direction of the tape, which arrangement comprises a control device and a write current generator adapted to generate a write current as a test signal with a given number of graded amplitude values, which write current generator is controllable by the control device to generate the different amplitude values of the write current and is connected to the magnetic head to supply the generated write current to this magnetic head, and a processing device by means of which the level values of the scanned and reproduced test signal, which correspond to the graded amplitude values of the write current recorded as a test signal, can be determined, and a logic device by means of which an optimum amplitude value of the write current can be determined from the level values thus determined.

2. Description of the Related Art

A method of the type defined in the first paragraph and an arrangement of the type defined in the second paragraph are known from DE-A1 41 18 533. In this known method and in the known arrangement, the generation and application of the given number of graded amplitude values of a write current applied to a magnetic head as a test signal in total cover a plurality of scanning periods of the magnetic head, so that the test signal is recorded in a plurality of oblique tracks. It is therefore obvious that the reproduction and processing of the scanned and reproduced test signal also cover a plurality of scanning periods. As a result of this, the known method of optimising a write current for at least one rotatable magnetic head takes a comparatively long time of a few seconds, which is annoying to the user of, for example, a video recorder using the known method. Moreover, since the reproduction and processing of the recorded test signal cover a plurality of scanning periods and hence a plurality of oblique tracks, the known method and the known arrangement also have the disadvantage that a poor tracking and changes in the tracking of a magnetic head which scans and reproduces the recorded test signal have an adverse effect on the measurement accuracy for the different values of the level of the scanned and reproduced test signal.

SUMMARY OF THE INVENTION

It is an object of the invention to avoid the aforementioned problems and to simply improve a method, of the type defined in the first paragraph, of optimizing a write current for at least one rotatable magnetic head, and an arrangement of the type defined in the second paragraph, for carrying out a method of the type defined in the first paragraph, in such a manner that a write current for at least one rotatable magnetic head can be optimized in a very short time and this optimization can be effected substantially independently of the tracking of a magnetic head which scans and reproduces the recorded test signal. To this end, according to the invention, such a method is characterized in that the total given number of graded amplitude values of the write current applied to the magnetic head as the test signal is applied to the magnetic head within a single scanning period of this magnetic head. In this way it is achieved that optimization of a write current for at least one rotatable magnetic head is possible within only one scanning period of such a magnetic head in the most favorable case, i.e. when immediately after the test signal has been recorded by the magnetic head for which the write current is to be optimized the recorded test signal is reproduced by means of a further magnetic head and the scanned and reproduced test signal is processed. However, also if recording and reproduction of the test signal do not succeed one another directly, the method of optimizing a write current can be carried out in a very short time which is only slightly longer than two successive scanning periods. Moreover, by the steps in accordance with the invention, it is achieved that optimization is also substantially independent of an optimum tracking of a magnetic head by means of which the recorded test signal is scanned and reproduced because, although the values of the level of the scanned and reproduced test signal which correspond to the graded amplitude values of the write current recorded as a test signal in an oblique track depend in absolute magnitude on the tracking of the scanning and reproducing magnetic head relative to each oblique track in which the test signal has been recorded, this is not the case with their magnitude relative to one another, so that even in the case of a non-optimum tracking of the scanning, and reproducing magnetic head relative to the oblique tracks containing the test signal, the differences between the scanned and reproduced level values can always be determined correctly, so that from the level values thus determined, an optimum amplitude value of a write current can be derived independently of an exact tracking.

With a method in accordance with the invention, the test signal can be recorded while the magnetic tape is driven in the longitudinal direction of the tape. Immediately after its recording, the test signal recorded in an oblique track can be read and reproduced at once from this oblique track by means of a separate magnetic head provided for this purpose. When no such separate magnetic head has been provided and, as a consequence, recording and reproduction of the test signal should be effected with only one magnetic head while the magnetic tape is driven, the magnetic tape is rapidly rewound in a reverse mode after recording of the test signal, after which the test signal can be reproduced by means of the same magnetic head with which it has been recorded. However, it has proved to be very advantageous if the total given number of graded amplitude values of the write current is applied to the magnetic head within a single scanning period of the magnetic head while the magnetic tape is stationary. Thus, it is achieved in a particularly simple manner that the test signal can be recorded and reproduced by means of only one magnetic head without the magnetic tape having to be rewound between recording and reproduction of the test signal, so that a very simple and rapid optimization is possible.

It has then proved to be particularly advantageous if the total given number of graded amplitude values of the write current is applied to the magnetic head within half a scanning period of the magnetic head while the magnetic tape is stationary. In this way, a write current for two diametrically disposed magnetic heads can be optimized by means of only one oblique track, each of the two magnetic heads successively recording a test signal associated with one magnetic head in this one oblique track and each of the two successively recorded test signals being subsequently scanned with the relevant associated magnetic head.

It has also proved to be advantageous if a write current with eight to sixteen graded amplitude values is applied to the magnetic head as a test signal within a single scanning period. This results in an optimum compromise between a fine gradation of the amplitude values of the write current generated as a test signal and a suitable number of gradations of the amplitude values.

Moreover, it has proved to be advantageous if the amplitude values of the write current generated as a test signal are graded in steps of 1 dB relative to one another. This has proved to be favorable both as regards the generation of the graded amplitude values and as regards a correct processing of the scanned and reproduced test-signal level values corresponding to the recorded amplitude values.

An arrangement for carrying out a method in accordance with the invention is characterized in that the control device and the write current generator are adapted to generate the total given number of graded amplitude values of the write current, which is applied to the magnetic head as the test signal, is applied to the magnetic head within a single scanning period of this magnetic head.

It has proved to be advantageous for such an arrangement if the control device and the write current generator are adapted to generate a write current with eight to sixteen graded amplitude values within a single scanning period of the magnetic head.

Moreover, it has proved to be advantageous for such an arrangement if the write current generator generates as a test signal, a write current with amplitude values graded in steps of 1 dB relative to one another.

It has proved to be particularly advantageous if the control device is triggered by a tachosignal from a tachogenerator coupled to the rotatable magnetic head. In this way it is achieved that the track portions which correspond to the total given number of graded amplitude values of the write current applied to the magnetic head as a test signal can be brought simply into a given desired relative position with respect to a complete track in which the test signal is recorded.

BRIEF DESCRIPTION OF THE DRAWINGS

The invention will be described with reference to two exemplary embodiments which are shown in the Figures and to which the invention is not limited.

FIGS. 2A–2G show waveforms of signals appearing in the video recorder 1 and in the arrangement for write current optimization;

FIGS. 3A and 3B show waveforms of signals appearing in a video recorder in accordance with a second embodiment of the invention and in an arrangement included in this video recorder for optimizing a write current for two rotatable magnetic head; and FIG. 4 shows a track layout of oblique tracks as obtained on a magnetic tape when this magnetic tape is scanned in the video recorder in accordance with the second embodiment of the invention.

DESCRIPTION OF THE PREFERRED EMBODIMENT

Figure 1:
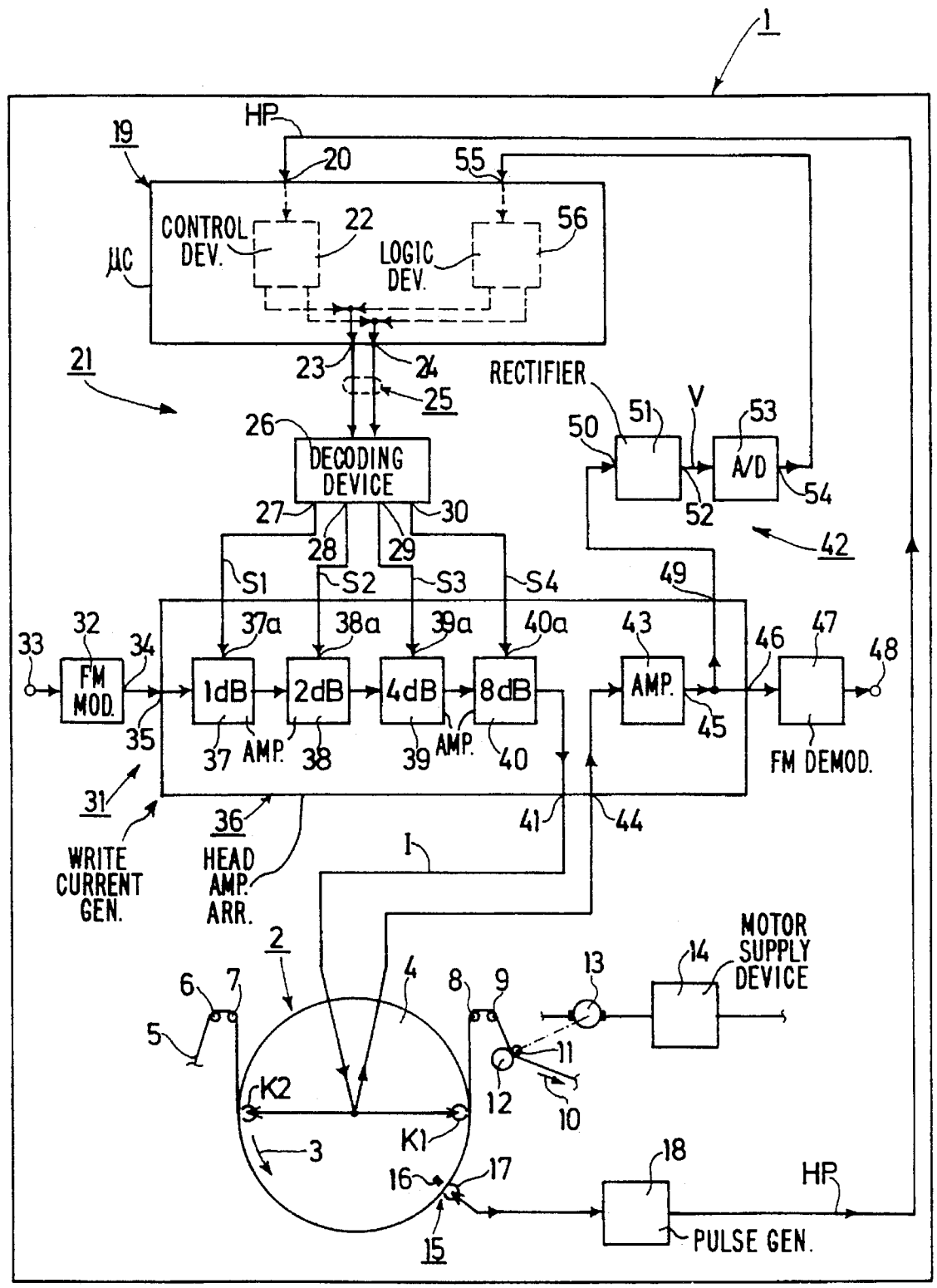
FIG. 1 shows diagrammatically the relevant parts of a video recorder in accordance with a first embodiment of the invention, by means of which video signals can be recorded in and subsequently be reproduced from tracks on a magnetic tape which are inclined relative to the longitudinal direction of the tape and which comprises an arrangement for carrying out a method of optimizing a write current for two rotatable magnetic heads.

FIG. 1 shows diagrammatically the pan of a video recorder which is relevant in the present context. The video recorder 1 has a drum-shaped scanning device 2, which comprises a drum section 4 which is rotatable in a direction indicated by an arrow 3 by means of a motor, not shown. The rotatable drum section 4 of the video recorder 1 carries two magnetic heads K1 and K2, which are thus rotatable.

A magnetic tape 5, which can be introduced into the video recorder 1, is wrapped around the drum-shaped scanning device 2 along a helical path over an angle of slightly more than 180° by passing the magnetic tape 5 around tape guides 6, 7 and 8, 9. To drive the magnetic tape 5 in the direction indicated by an arrow 10, which indicates the transport direction of the magnetic tape 5 in the so-called "forward" mode, the video recorder 1 has a rotationally drivable capstan 11, against which the magnetic tape 5 can be pressed by means of a movable pressure roller 12, the capstan 12 being preferably driven directly by the motor 13. To power the motor 13 and to control its speed, the video recorder 1 comprises a motor supply device 14 which includes a speed control circuit and a motor supply circuit. It is to be noted that the magnetic tape 5 extends between two reels, not shown, which are accommodated in a cassette and which can also be driven by a drive means, for example in order to drive the magnetic tape 5 in the direction indicated by the arrow 10 in a "fast forward" mode or in a direction opposite to that indicated by the arrow 10 in a "fast reverse" mode.

To detect the speed of rotation of the rotatable drum section 4, the video recorder 1 comprises a tachogenerator 15. In the present case, the tachogenerator 15 is formed by a small magnet 16 arranged on the rotatable drum section 4 and a stationary magnetic head 17 arranged adjacent the rotatable drum section 4. Each time that the magnet 16 moves past the magnetic head 17 during the rotation of the rotatable drum section 4, a pulse is induced in the magnetic head 17. The magnetic head 17 is followed by a pulse processing and pulse generation stage 18 on whose output a so-called head-switching pulse HP is produced whose waveform is shown in FIG. 2A. The head-switching pulse HP has a falling edge, which appears briefly after the instant at which the rotatable magnetic head K1 comes into scanning contact with the magnetic tape 5 or briefly before the instant at which the rotatable magnetic head K2 loses contact with the magnetic tape 5. The head-switching pulse HP has a rising edge which appears briefly after the instant at which the magnetic head K2 comes into scanning contact with the magnetic tape 5 or briefly before the instant at which the magnetic head K1 is disengaged from the magnetic tape 5.

When the magnetic heads K1 and K2 are rotated and the magnetic tape 5 is driven with the normal tape speed in the direction indicated by the arrow 10, the two magnetic heads K1 and K2, as is generally known, scan tracks which are inclined relative to the longitudinal direction of the magnetic tape 5 in consecutive scanning periods T. Each of the two magnetic heads K1 and K2 is then in scanning contact with the magnetic tape 5 for one scanning period T. In FIG. 2A, the scanning period T of the magnetic head K1 is designated T(K1) and the scanning period T of the magnetic head K2 is designated T(K2). The two scanning periods T(K1) and T(K2) slightly overlap one another.

The video recorder 1 further comprises a microcomputer 19 which is adapted to perform a multitude of actuation and control functions, only some of which will be discussed hereinafter. Now it is to be noted already that the output signal of the pulse generation stage 18, i.e. the head-switching pulse HP, is applied to an input 20 of the microcomputer 19.

The video recorder 1 further comprises an arrangement 21 for carrying out a method of optimizing a write current for the two rotatable magnetic heads K1 and K2. The drum-shaped scanning device 2 and the drive means for driving the magnetic tape 5 also form parts of the arrangement 21.

The arrangement 21 comprises a control device 22 which in the present video recorder 1 is implemented by means of the microcomputer 19, as is shown diagrammatically in broken lines in FIG. 1. The part of the microcomputer 19 which forms the control device 22 is triggered by the head-switching pulse HP, which is formed by the pulse-shaped tachosignal from the tachogenerator 15 coupled to the two rotatable magnetic heads K1 and K2. The part of the microcomputer 19 which forms the control device 22 is adapted to generate control information which changes at fixed time intervals T1, as illustrated in FIG. 2A–2G, This control information is applied to a decoding device 26 via a bus 25 connected to two outputs 23 and 24 of the microcomputer 19. The decoding device 26 decodes the control information generated by the part of the microcomputer 19 which forms the control device 22, in such a manner that the pulse-shaped control signal S1, shown in FIG. 2B, appears on an output 27 of the decoding device 26, the pulse-shaped control signal S2, shown in FIG. 2C, appears on an output 28, the pulse-shaped control signal S3, shown in FIG. 2D, appears on an output 29, and the pulse-shaped control signal S4, shown in FIG. 2E, appears on an output 30 of the decoding device 26.

The arrangement 21 further comprises a write current generator 31 for the generation of a write current I, which serves as a test signal, for the two rotatable magnetic heads K1 and K2. The write current generator 31 is adapted to generate the write current I serving as the test signal with a given number of amplitude values which are graded relative to one another, as will be described in detail hereinafter. To this end, the write current generator 31 can be controlled, via the decoding device 26, by the part forming the control device 22 in the microcomputer 19, in order to generate the different amplitude values of the write current I. The write current generator 31 is connected to the two magnetic heads K1 and K2 to supply the resulting graded write current to these heads.

In order to realize the write current generator 31, the following steps have been taken in the video recorder 1. The video recorder 1 comprises an FM modulator device 32, which is arranged to receive a luminanee signal (Y signal) appearing on an internal connection 33, for the frequency modulation of this luminanee signal. On its output, the FM modulator device 32 supplies a frequency-modulated signal whose amplitude is substantially independent of the picture content of the modulated luminance signal. In order to optimize the write current to the two rotatable magnetic heads K1 and K2 for the luminance signal, the FM modulator device 32 in the present video recorder 1 produces, for example, the unmodulated FM career on its output 34 as the test signal. The output 34 of the FM modulator device 32 is connected to an input 35 of a head amplifier arrangement 38. The head amplifier arrangement 36 comprises four switchable amplifiers 37, 38, 39 and 40, arranged in series with one another. The first switchable amplifier 37 is connected to the input 35 of the head amplifier arrangement 36 and the fourth switchable amplifier 40 is connected to an output 41 of the head amplifier arrangement 36. The gain of the switchable amplifier 37 is switchable between 0 dB and 1 dB, switching being effected by means of the pulse-shaped control signal S1 applied to a control input 37a of the amplifier 37. The gain of the switchable amplifier 38 is switchable between 0 dB and 2 dB, switching being effected by means of the pulse-shaped control signal S2 applied to a control input 38a of the amplifier 38. The gain of the switchable amplifier 39 is switchable between 0 dB and 4 dB, switching being effected by means of the pulse-shaped control signal S3 applied to a control input 39a of the amplifier 39. The gain of the switchable amplifier 40 is switchable between 0 dB and 8 dB, switching being effected by means of the pulse-shaped control signal S4 applied to a control input 40a of the amplifier 40. By way of illustration, it is to be noted that, for example, when the two switchable amplifiers 37 and 38 are turned on by means of the control signals S1 and S2 the signal applied to the input 35 of the head amplifier arrangement 36 will be amplified by 3 dB in total and will appear in this form on the output 41 of the head amplifier arrangement 36. When all four switchable amplifiers 37, 38, 39 and 40 are turned on by means of the control signals S1, S2, S3 and S4 the signal applied to the input 35 of the head amplifier arrangement 36 will be amplified by 15 dB in total and will appear in this form on the output 41 of the head amplifier arrangement 36. However, the gain of the switchable amplifiers 37, 38, 39 and 40 may also be selected in such a manner that a write current I with graded amplitude values can be generated as a test signal, for which successive amplitude values each time differ by 0.5 dB or any other value. Instead of four switchable amplifiers it is also possible to provide three, five or any other number of such amplifiers, the write current generated as a test signal then being graded accordingly.

As already stated hereinbefore, the control signals S1, S2, S3 and S4, shown in FIGS. 2B–2E, are applied to the switchable amplifiers 37, 38, 39 and 40 when an optimization process is carried out. As a result of this, a write current I with a total of sixteen graded amplitude values is produced as a test signal on the output 41 of the head amplifier arrangement 36, as is shown in FIG. 2F. As already stated, the test signal is then formed by the unmodulated FM carrier, which is partly shown only diagrammatically in FIG. 2F. However, FIG. 2F shows the total envelope of the test signal having a total of sixteen graded amplitude values.

In the arrangement 21 for optimizing a write current for the two rotatable magnetic heads K1 and K2, as is apparent from FIGS. 2A and 2F, the microcomputer 19, which forms the control device 22, and write current generator 31 are constructed to generate the total given number of graded amplitude values of the write current I, which values are applied to the two magnetic heads K1 and K2 as the test signal, within a single scanning period T of each of the two magnetic heads K1 and K2, respectively. Thus, it is achieved that the total given number of graded amplitude values of the write current I applied to the two magnetic heads K1 and K2 as the test signal is applied to the relevant magnetic head K1 or K2 within a single scanning period T(K1) or T(K2) of the respective magnetic head.

It is to be noted that, as is common practice, the test signal I is applied from the output 41 of the head amplifier arrangement 36 to the rotatable magnetic heads K1 and K2 via a rotary transformer, which for the sake of simplicity, is not shown separately in FIG. 1.

The arrangement 21 for optimizing a write current for the two rotatable magnetic heads K1 and K2 further comprises a processing device 42 by means of which the level values V of the scanned and reproduced test signal I, which correspond to the graded amplitude values of the write current I recorded as the test signal, can be determined and which are shown in FIG. 2G.

The processing device 42 is preceded by a reproducing-head amplifier 43, which is connected to an input 44 of the head amplifier arrangement 36. The input 44 is connected to the rotatable magnetic heads K1 and K2 via the rotary transformer, not shown. The output 45 of the reproducing-head amplifier 43 is connected to an output 46 of the head amplifier arrangement 36, which is connected to an FM demodulator device 47, by means of which the frequency-modulated luminance signal can be demodulated and which supplies a demodulated luminance signal to an internal connection 48 of the video recorder 1.

The output 45 of the reproducing-head amplifier 43 is also connected to a futher output 49 of the head amplifier arrangement 36. The output 49 is connected to an input 50 of a rectifier device 51 of the processing device 42. On an output 52, the rectifier produces the signal V shown in FIG. 2G. This signal V is the reproduced and rectified test signal which is scanned from the magnetic tape 5 and corresponds to the recorded test signal. The rectifier device 51 is followed by an analog-to-digital converter 53 of the processing device 42, which digitizes the individual level values contained in the signal V and produces data words on an output 54, which words represent the individual level values corresponding to the graded amplitude values of the write current I recorded as the test signal. The data words appearing on the output 54 are applied to an input 55 of the microcomputer 19.

The microcomputer 19 also functions as a logic device 56, as is shown diagrammatically in broken lines. The data words supplied by the analog-to-digital converter 53 are applied to the pan of the microcomputer 19 which functions as the logic device 56. By means of the pan of the microcomputer 19 which functions as the logic device 56, it is possible to derive from the data words, which correspond to the level values determined for the scanned and reproduced test signal, an optimum amplitude value of the write current for the two rotatable magnetic heads K1 and K2, as will be described in more detail hereinafter. After the optimum amplitude value of the write current for the magnetic heads K1 and K2 has thus been determined, the part of the microcomputer 19 which functions as the logic device 56 supplies control information, which is also applied to the decoder device 26 via the bus 25, after which the decoder device 26 permanently supplies a certain combination of control signals S1, S2, S3 and S4 in accordance with the applied control information, which causes a given configuration of the switchable amplifiers 37, 38, 39 and 40 to be activated, i.e. the configuration which provides the optimum value of the write current for the two rotatable magnetic heads K1 and K2 for the recording of the luminance signal in a normal recording process.

In the video recorder 1, shown in FIG. 1 an optimum write current for the two rotatable magnetic heads K1 and K2 for recording the luminance signal is, for example, determined as follows. Firstly, the optimization process is started, for example, by actuation of a separate key on the video recorder 1 or on a remote control device for the video recorder 1, said actuation causing the video recorder 1 to be set to the "recording" mode, in which the magnetic tape 5 is moved past the circumferential surface of the drum-shaped scanning device 2 in the direction indicated by the arrow 10 by means of the capstan 11 and the pressure roller 12. The rotatable drum section 4 is then also set into rotation. As soon as the magnet 16 on the rotatable drum section 4 moves past the magnetic head 17 of the tachogenerator 15 a pulse is produced, which results in the head-switching pulse HP being generated in the pulse-processing and pulse-generation stage 18, which pulse is applied to the input 20 of the microcomputer 19. Subsequently, the part of the microcomputer 19 which functions as the control device 22 is triggered, after which this part of the microcomputer 19 supplies such control information to the decoding device 26 that the decoding device 26 applies the pulse-shaped control signals S1, S2, S3 and S4, shown in FIGS. 2B–2E, to the switchable amplifiers 37, 38, 39 and 40 of the head amplifier arrangement 36. The FM modulator device 32 applies the unmodulated FM carrier to the first switchable amplifier 37 with a constant amplitude. As a result, the output 41 of the head amplifier arrangement 36 receives as the test signal a write current I with a given number, i.e. sixteen, of graded amplitude values. Such a write current I is shown in FIG. 2F. The write current I forming the test signal is applied from the head amplifier arrangement 36 to the two magnetic heads K1 and K2 via the rotary transformer, not shown, which magnetic head K1, for example, first records the applied graded test signal in an oblique track on the magnetic tape 5 in its scanning period T(K1), in which this head is in scanning contact with the magnetic tape 5, after which the second magnetic head K2 also records the applied graded test signal in a further track on the magnetic tape 5 in its scanning period T(K2). It suffices if each of the two heads K1 and K2 records a test signal in only one oblique track. However, the two magnetic heads K1 and K2 may also scan several oblique tracks during recording of the test signal.

After the test signal has been recorded by means of the two magnetic heads K1 and K2, the magnetic tape is briefly driven in the direction opposite to that of the arrow 10 by means of the capstan 11 and the pressure roller 12, so that the magnetic tape is moved back in a reverse mode in order to return to the first oblique track containing a test signal.

Subsequently, the video recorder 1 is set to the "playback" mode, in which the magnetic tape 5 is again driven in the direction of the arrow 10 by means of the capstan 11 and the pressure roller 12. The rotatable magnetic heads K1 and K2 then scan those oblique tracks in which the test signal has been recorded, thereby reproducing the previously recorded test signal from the magnetic tape 5. The scanned and reproduced test signal is applied to the input 44 of the head amplifier arrangement 36 via the rotary transformer, not shown, after which the reproduced test signals are amplified in the reproducing-head amplifier 43 and are subsequently rectified in the rectifier device 51, so that the level values V of the scanned and reproduced test signal I, which correspond to the graded amplitude values of the write current I recorded as the test signal and which are shown in FIG. 2G, are obtained on the output 52 of the rectifier device 51. The level values thus obtained are applied to the analog-to-digital converter 53, which generates for each of these level values a data word, which is applied to an input 55 of the microcomputer 19 which also functions as the logic device 56. The pan of the microcomputer 19 which functions as the logic device 56 processes the data words applied to it. The part of the microcomputer 19 which functions as the logic device 56 determines, for example, the data word corresponding to the largest level value of the test signal which is scanned and reproduced by means of the two magnetic heads K1 and K2. In accordance with this largest level value, the part of the microcomputer 19 which functions as the logic device 56 then supplies control information to the decoding device 26, which subsequently applies a combination of pulse-shaped control signals S1, S2, S3 and S4, in accordance with the applied control information, to the switchable amplifiers 37, 38, 39 and 40. This results in the switchable amplifiers being turned on in such a way that in normal operation of the video recorder 1, when the FM modulator device 32 supplies a frequency-modulated luminance signal, an optimum write current for the two rotatable magnetic heads K1 and K2 is obtained for recording the luminance signal.

It is to be noted that the part of the microcomputer 19 which functions as the logic device 56 need not necessarily determine only the maximum level value from the test signal which is scanned and reproduced by means of the two magnetic heads K1 and K2 but that this part of the microcomputer 19 can also determine a group of maximal level values and supply control information in accordance with the level value group thus determined, to obtain an optimum write current for recording the luminance signal by a suitable activation of a certain configuration of switchable amplifiers. Moreover, it is to be noted that in a video recorder which in normal operation not only records luminance signals or luminance signals and color signals in the oblique tracks by means of the magnetic heads K1 and K2, but prior thereto also sound signals by means of further rotatable magnetic heads, it may be advantageous if the microcomputer part performing the logic device function determines the maximum level value in the scanned and reproduced test signal but determines the optimum write current for the luminance signal not in accordance with the maximum level value but in accordance with a level value which is a given amount smaller because a slightly smaller write current for the luminance signal a sound signal which is previously recorded in the oblique tracks is erased less strongly by the subsequently recorded luminance signal.

As will be apparent from the foregoing, the total given number of graded amplitude values of the write current I applied to the two magnetic heads K1 and K2 as the test signal is applied to the relevant magnetic head K1 or K2 within a single scanning period T(K1) or T(K2) of the respective magnetic head. This has the advantage that for each magnetic head K1 or K2, the test signal can be recorded on only one track, so that recording and hence also the subsequent reproduction and the total optimization process can be carried out in a very short time. Since each test signal has been recorded within a single oblique track this also has the advantage that the reproduction of the recorded test signal is substantially independent of an optimum tracking of the magnetic head by means of which the recorded test signal is scanned and reproduced because, although the level values of the scanned and reproduced test signal which correspond to the graded amplitude values of the write current recorded as the test signal in an oblique track depend in absolute magnitude on the tracking of the scanning and reproducing magnetic head relative to each oblique track in which the test signal has been recorded, this is not the case with their magnitude relative to one another, so that even in the case of a non-optimum tracking of the scanning and reproducing magnetic head relative to the oblique track containing the test signal the differences between the scanned and reproduced level values can always be determined correctly, so that from the level values thus determined an optimum amplitude value of a write current can be derived independently of an exact tracking.

A second embodiment of the invention will now be described with reference to FIGS. 3A, 3B and 4. In the same way as FIG. 2A, FIG. 3A shows the head-switching pulse HP of a video recorder, not shown, in accordance with the second embodiment. FIG. 3B shows a write current I with a given number, i.e. eight, of graded amplitude values, which write current can be applied to two rotatable magnetic heads K1 and K2 as a test signal. As is apparent from FIGS. 3A and 3B, the total given number of graded amplitude values of the write current I, i.e. all eight amplitude values, are applied to the respective magnetic head K1 or K2 within half a scanning period T/2 of the relevant magnetic head.

In the video recorder in accordance with the second embodiment, which receives the write current shown in FIG. 3B as a test signal, the test signal is applied to the two magnetic heads K1 and K2 with a stationary magnetic tape 5, the two magnetic heads K1 and K2 scanning the same oblique still track 57, as shown in FIG. 4, which shows a track layout of the magnetic tape. 5. Broken lines in the track layout represent those oblique tracks 58 which are scanned by the two rotatable magnetic heads K1 and K2 when the magnetic tape 5 is moved at the normal tape speed. A solid line indicates a still track 57, in which the test signal shown in FIG. 3B is recorded. Different hatchings in the still track indicate that the two magnetic heads K1 and K2 have different azimuth angles.

First of all, the "recording" mode is activated with stationary magnetic tape during an optimization process to optimize a write current for the two rotatable magnetic heads K1 and K2 in such a video recorder in accordance with the second embodiment. The test signal is then recorded in such a manner that first the magnetic head K1 scans the still track 57 and records the test signal formed by the graded write current I with eight amplitude values in the still track 57 within the first half scanning period T/2. No test signal is applied to the magnetic head K1 in the second half scanning period T/2 of this head, so that the magnetic head K1 does not make a recording in the still track 57. After the magnetic head K1 has left the still track 57, the magnetic head K2 will reach the still track 57, no signal being applied to the magnetic head K2 during its first half scanning period T/2, so that the test signal already recorded in the still track 57 by the magnetic head K1 is not influenced in any case. The test signal in the form of the graded write current I with eight amplitude values is applied to the magnetic head K2 within the second half scanning period T/2 of this head, this test signal then being recorded in the remaining part of the still track 57 by the magnetic head K2.

Immediately after the test signal has been recorded by the two magnetic heads K1 and K2 with stationary tape 5, the video recorder is set to the "playback" mode with the magnetic tape 5 still stationary, after which each of the two magnetic heads K1 and K2 scans and reproduces the test signal in the still track 57 in accordance with the azimuth angle of the respective head. The scanned and reproduced test signal is then again applied to a head amplifier and a processing device in order to determine the level values of the scanned and reproduced test signal which correspond to the graded amplitude values of the write current recorded as the test signal, after which a logic device derives an optimum write current from the level values thus determined.

If in a video recorder in accordance with the second embodiment the still track selected for recording the test signal with stationary magnetic tape is situated in a part of the magnetic tape in which previously a recording has been made in the normal oblique tracks, it is advantageous to erase the existing recordings with at least one rotatable erase head at the location of the still track or to overwrite the existing recordings with an auxiliary signal at the location of the still track, namely in such a manner that in the track portion of the still track in which a test signal is to be recorded with one of the two magnetic heads with different azimuth angles, the auxiliary signal for overwriting the existing recordings is recorded previously by the respective other one of the two magnetic heads.

In the video recorder in accordance with the second embodiment, it is particularly advantageous that recording and reproduction of the test signal are effected with stationary magnetic tape, so that it is not necessary to rewind the magnetic tape between recording and reproduction of the test signal and recording and reproduction of the test signal can be effected with one and the same magnetic head, which has the advantage that it is simple and, in particular, that the optimization process is as short as possible.

The two embodiments described above illustrate the optimization of a write current for two rotatable magnetic heads for the optimum recording of luminance signals. It is obvious that such optimization processes can also be used for write currents for the recording of color signals or for write currents for the recording of audio signals, the reproduced level values of a test signal for the optimization of a write current for color signals being processed in such a manner that intermodulation interference terms resulting from intermodulation between the luminance signal and the color signal are situated in such a desired amplitude range that no visible interference is produced when the signals are reproduced on a display screen. Moreover, such optimization processes can be used not only for an optimum recording of analog signals but also for an optimum recording of digital signals. In addition, such a write-current optimization can also be effected for more than two rotatable magnetic heads of a drum-shaped scanning device. In the two embodiments described hereinbefore, an arrangement for write current optimization forms pan of a video recorder. However, such an arrangement may also be constructed as a separate arrangement to be used for write current optimization in the production of helical-scan recording and reproducing apparatuses, in which case such an arrangement may also comprises a plurality of separate apparatuses.

I claim:

1. A method of optimizing a write current for at least one rotatable magnetic head for scanning a magnetic tape along a plurality of tracks which are inclined relative to the longitudinal direction of the magnetic tape in a respective plurality of consecutive scanning periods, each track corresponding to a single scanning period, said method comprising the steps:

applying a write current to the magnetic head as a test signal with a given number of graded amplitude values within a given time interval and this test signal being recorded on the magnetic tape by the magnetic head;

scanning the recorded test signal from the magnetic tape;

determining the level values of the scanned and reproduced test signal, which correspond to the graded amplitude values of the write current recorded as the test signal; and determining an optimum amplitude value of the write current from the level values thus determined, characterized in that in said step of applying a write current, the total given number of graded amplitude values of the write current applied to the magnetic head as the test signal is applied to the magnetic head within a single one of said respective plurality of consecutive scanning periods of this magnetic head.

2. A method as claimed in claim 1, characterized in that said step of applying a write current comprises applying the total given number of graded amplitude values of the write current to the magnetic head within said single scanning period of the magnetic head while the magnetic tape is stationary.

3. A method as claimed in claim 2, characterized in that said step of applying a write current comprises applying the total given number of graded amplitude values of the write current to the magnetic head within half of said single scanning period of the magnetic head while the magnetic tape is stationary.

4. A method as claimed in claim 3, characterized in that said step of applying a write current comprises applying the write current with eight to sixteen graded amplitude values is applied to the at least one rotatable magnetic head as a test signal within said single scanning period.

5. A method as claimed in claim 4, characterized in that said step of applying a write current comprises grading the amplitude values of the write current generated as a test signal in steps of 1 dB relative to one another.

6. A method as claimed in claim 3, characterized in that said step of applying a write current comprises grading the amplitude values of the write current generated as a test signal in steps of 1 dB relative to one another.

7. A method as claimed in claim 2, characterized in that said step of applying a write current comprises applying the write current with eight to sixteen graded amplitude values is applied to the at least one rotatable magnetic head as a test signal within said single scanning period.

8. A method as claimed in claim 7, characterized in that said step of applying a write current comprises grading the amplitude values of the write current generated as a test signal in steps of 1 dB relative to one another.

9. A method as claimed in claim 2, characterized in that said step of applying a write current comprises grading the amplitude values of the write current generated as a test signal in steps of 1 dB relative to one another.

10. A method as claimed in claim 1, characterized in that said step of applying a write current comprises applying the write current with eight to sixteen graded amplitude values to the magnetic head as a test signal within said single scanning period.

11. A method as claimed in claim 10, characterized in that said step of applying a write current comprises grading the amplitude values of the write current generated as a test signal in steps of 1 dB relative to one another.

12. A method as claimed in claim 1, characterized in that said step of applying a write current comprises grading the amplitude values of the write current generated as the test signal in steps of 1 dB relative to one another.

13. An arrangement for optimizing a write current for a magnetic tape for a recording and playback apparatus, said recording and playback apparatus comprising:

at least one rotatable magnetic head for receiving the write current and for applying a recording signal onto a magnetic tape, and for scanning a signal recorded on said magnetic tape and for producing a read signal;

drive means for moving said magnetic tape in a longitudinal direction past said at least one rotatable magnetic head, whereby said magnetic tape is scannable by said at least one rotatable magnetic head in a plurality of consecutive scanning periods along a respective plurality of tracks which are inclined relative to the longitudinal direction of the tape, each track corresponding to a single scanning period, said arrangement comprising:

a control device and a write current generator adapted to generate a write current as a test signal with a given number of graded amplitude values, said write current generator being controllable by the control device to generate the number of graded amplitude values of the write current and being connected to the at least one magnetic head to supply the generated write current to the at least one rotatable magnetic head;

a processing device for determining the level values of the scanned and reproduced test signal, which correspond to the graded amplitude values of the write current recorded as a test signal; and a logic device for determining an optimum amplitude value of the write current from the level values determined by said processing device, characterized in that the control device and the write current generator comprise means for generating and applying the total given number of graded amplitude values of the write current to the at least one rotatable magnetic head as the test signal within a single one of said plurality of consecutive scanning periods of the at least one rotatable magnetic head.

14. An arrangement as claimed in claim 13, characterized in that the control device and the write current generator generate the write current with eight to sixteen graded amplitude values within said single scanning period of the at least one rotatable magnetic head.

15. An arrangement as claimed in claim 14, characterized in that the write current generator generates the write current with amplitude values graded in steps of 1 dB relative to one another.

16. An arrangement as claimed in claim 15, characterized in that the arrangement further comprises a tachogenerator coupled to the at least one rotatable magnetic head, said tachogenerator generating a tachosignal for triggering the control device.

17. An arrangement as claimed in claim 14, characterized in that the arrangement further comprises a tachogenerator coupled to the at least one rotatable magnetic head, said tachogenerator generating a tachosignal for triggering the control device.

18. An arrangement as claimed in claim 13, characterized in that the write current generator generates the write current with amplitude values graded in steps of 1 dB relative to one another.

19. An arrangement as claimed in claim 18, characterized in that the arrangement further comprises a tachogenerator coupled to the at least one rotatable magnetic head, said tachogenerator generating a tachosignal for triggering the control device.

20. An arrangement as claimed in claim 13, characterized in that the arrangement further comprises a tachogenerator coupled to the at least one rotatable magnetic head, said tachogenerator generating a tachosignal for triggering the control device.

* * * * *